United States Patent
Bolyos (10) Patent No.: US 11,502,284 B2
(45) Date of Patent: Nov. 15, 2022

(54) SYSTEMS AND METHODS FOR GENERATING AN ELECTROCHEMICAL CELL HAVING A MULTI-PART ANODE

(71) Applicant: Energizer Brands, LLC, St. Louis, MO (US)

(72) Inventor: Christopher Steven Bolyos, Lorain, OH (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

(21) Appl. No.: 17/144,672

(22) Filed: Jan. 8, 2021

(65) Prior Publication Data

US 2021/0226191 A1    Jul. 22, 2021

Related U.S. Application Data

(60) Provisional application No. 62/964,374, filed on Jan. 22, 2020.

(51) Int. Cl.
*B05B 1/26* (2006.01)
*B05B 12/14* (2006.01)
(Continued)

(52) U.S. Cl.
CPC .......... *H01M 4/0411* (2013.01); *B05B 1/265* (2013.01); *B05B 5/12* (2013.01); *B05B 12/1472* (2013.01); *B05C 5/00* (2013.01); *B05C 7/08* (2013.01)

(58) Field of Classification Search
USPC ........ 118/300, 408, 410, 317, 306; 429/163; 29/623.1
See application file for complete search history.

(56) References Cited

U.S. PATENT DOCUMENTS

| 5,401,590 A | 3/1995 | Chalilpoyil et al. |
| 5,962,163 A | 10/1999 | Urry |

(Continued)

FOREIGN PATENT DOCUMENTS

| AU | 438685 B2 | 7/1973 |
| EP | 2278645 A1 | 1/2011 |

(Continued)

OTHER PUBLICATIONS

International Searching Authority, International Search Report and Written Opinion received for International Application No. PCT/US2021/013151, dated May 12, 2021, 10 pages, European Patent Office, Netherlands.

(Continued)

*Primary Examiner* — Yewebdar T Tadesse
(74) *Attorney, Agent, or Firm* — Alston & Bird LLP (57) ABSTRACT

A nozzle is provided for providing anode material into an electrochemical cell and method of using the same. The nozzle comprises a hollow tubular body extending between an open upper end and an open lower end; a lower deflector spaced apart from the open lower end of the hollow tubular body and forming an annular opening between a deflection surface of the lower deflector and the open lower end of the hollow tubular body; and a support rod connecting the lower deflector with the hollow tubular body, wherein the support rod is suspended within an interior of the hollow tubular body by one or more support trusses.

20 Claims, 6 Drawing Sheets

(51) Int. Cl.
*B05B 5/12* (2006.01)
*B05C 7/08* (2006.01)
*H01M 4/04* (2006.01)
*B05C 5/00* (2006.01)

(56) References Cited

U.S. PATENT DOCUMENTS

| | | | |
|---|---|---|---|
| 7,147,678 | B2 | 12/2006 | Jiang et al. |
| 7,597,824 | B2 | 10/2009 | Zhu et al. |
| 8,039,150 | B2 | 10/2011 | Burchardt et al. |
| 8,323,835 | B2 | 12/2012 | Davis et al. |
| 8,586,244 | B2 | 11/2013 | Fensore et al. |
| 10,446,832 | B2 | 10/2019 | Armacanqui et al. |
| 2001/0053473 | A1* | 12/2001 | Getz ................. H01M 6/08 429/128 |
| 2007/0248879 | A1 | 10/2007 | Durkot et al. |
| 2010/0081046 | A1 | 4/2010 | Davis et al. |
| 2018/0261851 | A1 | 9/2018 | Huang |
| 2018/0316064 | A1 | 11/2018 | Wei et al. |
| 2020/0106109 | A1 | 4/2020 | Liu et al. |

FOREIGN PATENT DOCUMENTS

| | | |
|---|---|---|
| JP | S 38-019819 Y | 9/1963 |
| JP | 2007-521617 A | 8/2007 |
| JP | 2009-164079 A | 7/2009 |
| JP | 2010-524174 A | 11/2013 |
| JP | 2018-506150 A | 3/2018 |
| WO | WO 2000/030193 | 5/2000 |

OTHER PUBLICATIONS

Ghavami, Robab Khayat, et al., "Performance improvements of alkaline batteries by studying the effects of different kinds of surfactant and different derivatives of benzene on electrochemical properties of electrolytic zinc", Journal of Power Sources, Nov. 22, 2006, pp. 893-899, vol. 162, Elsevier, B.V., Netherlands.

Horn, QC. et al., *Morphology and Spatial Distribution of ZnO Formed in Discharged Alkaline Zn/MnO2 AA Cells*, Journal of the Electrochemical Society, May 1, 2003, vol. 150, Issue 5, pp. A652-A658. DOI: 10.1149/1.1566014.

Huot, Jean-Yves, et al., "Electrochemical performance of gelled zinc alloy powders in alkaline solutions", Journal of Power Sources, Apr. 21-23, 1997, pp. 81-85, vol. 65, Elsevier Science S.A., Netherlands.

Mao, Z. et al., *Mathematical Modeling of a Primary Zinc/Air Battery*, Journal of the Electrochemical Society, Apr. 1, 1992, vol. 139, No. 4, pp. 1105-1114. DOI: 10.1149/1.2069348.

Newman, JS. et al., *Theoretical Analysis of Current Distribution in Porous Electrodes*, Journal of the Electrochemical Society, Dec. 1962, pp. 1183-1191, vol. 109, No. 12. DOI: 10.1149/1.2425269.

Orikasa, Y. et al., *Ionic Conduction in Lithium Ion Battery Composite Electrode Governs Cross-Sectional Reaction Distribution*, Scientific Reports 6, Article No. 2, May 19, 2016, (6 pages). DOI:10.1038/srep26382.

Salager, Jean-Louis, "Surfactants, Types and Uses", FIRP Booklet # E300-A, 2002, 50 pages, Version 2, Universidad De Los Andes, Venezuela.

Samal, Prasan K., Newkirk, Joseph W. (2015). ASM Handbook, vol. 7—Powder Metallurgy (2015)—12.2 Powder Flow. (pp. 116-117). ASM International. Retrieved from https://app.knovel.conn/hotlink/pdf/id:kt010RU151/asnn-handbook-volume-7/powder-flow (Year: 2015).

Sun, YK et al., *Nanostructured High-Energy Cathode Materials for Advanced Lithium Batteries*, Nature Materials Letters (Advance Online Publication), Oct. 7, 2012, vol. 11, (6 pages).

\* cited by examiner

SYSTEMS AND METHODS FOR GENERATING AN ELECTROCHEMICAL CELL HAVING A MULTI-PART ANODE

CROSS-REFERENCE TO RELATED APPLICATIONS

This patent application claims priority to U.S. Provisional Appl. Ser. No. 62/964,374 filed Jan. 22, 2020 which is incorporated herein by reference in its entirety.

BACKGROUND

Particularly for bobbin-style electrochemical cells commonly found in alkaline batteries, the positional oxidation of anode particles impacts the overall performance of the electrochemical cell. In these bobbin-style cells, a cathode (typically comprising manganese dioxide as an active material in alkaline primary cells) is formed as a generally hollow tube positioned within a cell container. An anode (typically comprising zinc or a zinc composite) is positioned within the hollow interior of the cathode and is separated from the cathode by a separator. A current collector (e.g., a nail) is positioned at the center of the anode. The entire composition is saturated in a KOH electrolyte.

Recently, small scale tests of electrochemical cells including multiple anode portions, positioned at least substantially concentrically within the center of a bobbin-style alkaline cell have yielded promising results with respect to improvements in overall cell performance. For example, as discussed in co-pending U.S. patent application Ser. No. 15/896,917, filed on Feb. 14, 2018, and U.S. patent application Ser. No. 16/145,830, filed Sep. 28, 2018, the contents of which are incorporated herein by reference in their entirety, certain cell configurations having dual anodes exhibit increased high-rate discharge performance with minimal tradeoffs for low-rate service. While these small-scale laboratory tests have demonstrated promising performance increases for alkaline electrochemical cells, there has not been a significant effort toward developing manufacturing techniques for manufacturing alkaline electrochemical cells having dual-anode configurations at large scale. Accordingly, a need exists for novel alkaline electrochemical cell manufacturing techniques for manufacturing electrochemical cells having improved discharge performance.

BRIEF SUMMARY

Various embodiments provide systems and methods for constructing an electrode (e.g., an anode) for an electrochemical cell to provide a characteristic gradient (e.g., to provide at least two anode portions therein). Certain embodiments are directed to an extrusion nozzle configured for generating an anode ring within an electrochemical cell (e.g., within an open interior formed by a cathode ring and separator of the cell).

Various embodiments are directed to a nozzle for providing an electrode material into an electrochemical cell, the nozzle comprising: a hollow tubular body extending between an open upper end and an open lower end; a lower deflector spaced apart from the open lower end of the hollow tubular body and forming an annular opening between a deflection surface of the lower deflector and the open lower end of the hollow tubular body; and a support rod connecting the lower deflector with the hollow tubular body, wherein the support rod is suspended within an interior of the hollow tubular body by one or more support trusses.

In certain embodiments, the support rod and the lower deflector define a conduit extending therethrough. Moreover, the lower deflector may have a diameter larger than an outer second diameter of the hollow tubular body. In certain embodiments, the deflection surface is embodied as a concave surface. In various embodiments, the annular opening is adjustable. In certain embodiments, the annular opening has a height between about 0.09" to about 0.125". In various embodiments, the deflector has a diameter between about 0.24" to about 0.275". In certain embodiments, the one or more support trusses are spaced at radial locations distributed at least substantially equally around an interior of the hollow tubular body. In various embodiments, the one or more support trusses comprises a plurality of support trusses at each radial location.

Certain embodiments are directed to a method for forming an electrode of an electrochemical cell, the method comprising: positioning a nozzle within a central opening of the electrochemical cell; retracting the nozzle from the central opening of the electrochemical cell while continuously extruding a first anode material through an annular opening located proximate a lower end of the nozzle to form a first anode portion having a central opening; and extruding a second anode material into the central opening of the first anode portion.

In various embodiments, extruding the second anode material into the central opening of the first anode portion comprises extruding the second anode material through a central conduit within the nozzle while the nozzle is retraced from the central opening of the electrochemical cell. In certain embodiments, the nozzle comprises: a hollow tubular body extending between an open upper end and an open lower end; a lower deflector spaced apart from the open lower end of the hollow tubular body and forming an annular opening between a deflection surface of the lower deflector and the open lower end of the hollow tubular body; and a support rod connecting the lower deflector with the hollow tubular body, wherein the support rod is suspended within an interior of the hollow tubular body by one or more support trusses; and wherein extruding the first anode material through the annular opening comprises: extruding the first anode material along a length of the hollow tubular body from the open upper end to the open lower end and against the deflection surface of the lower deflector, wherein the deflection surface redirects the first anode material through the annular opening. In certain embodiments, the method further comprises adjusting a height of the annular opening. According to certain embodiments, extruding the second anode material into the central opening of the first anode portion comprises extruding the second anode material into the central opening of the first anode portion after retracting the nozzle out of the central opening of the first anode portion.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Alkaline electrochemical cells are commercially available in cell sizes commonly known as LR6 (AA), LR03 (AAA), LR14 (C) and LR20 (D). The cells have a cylindrical shape that complies with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

Figure 1:
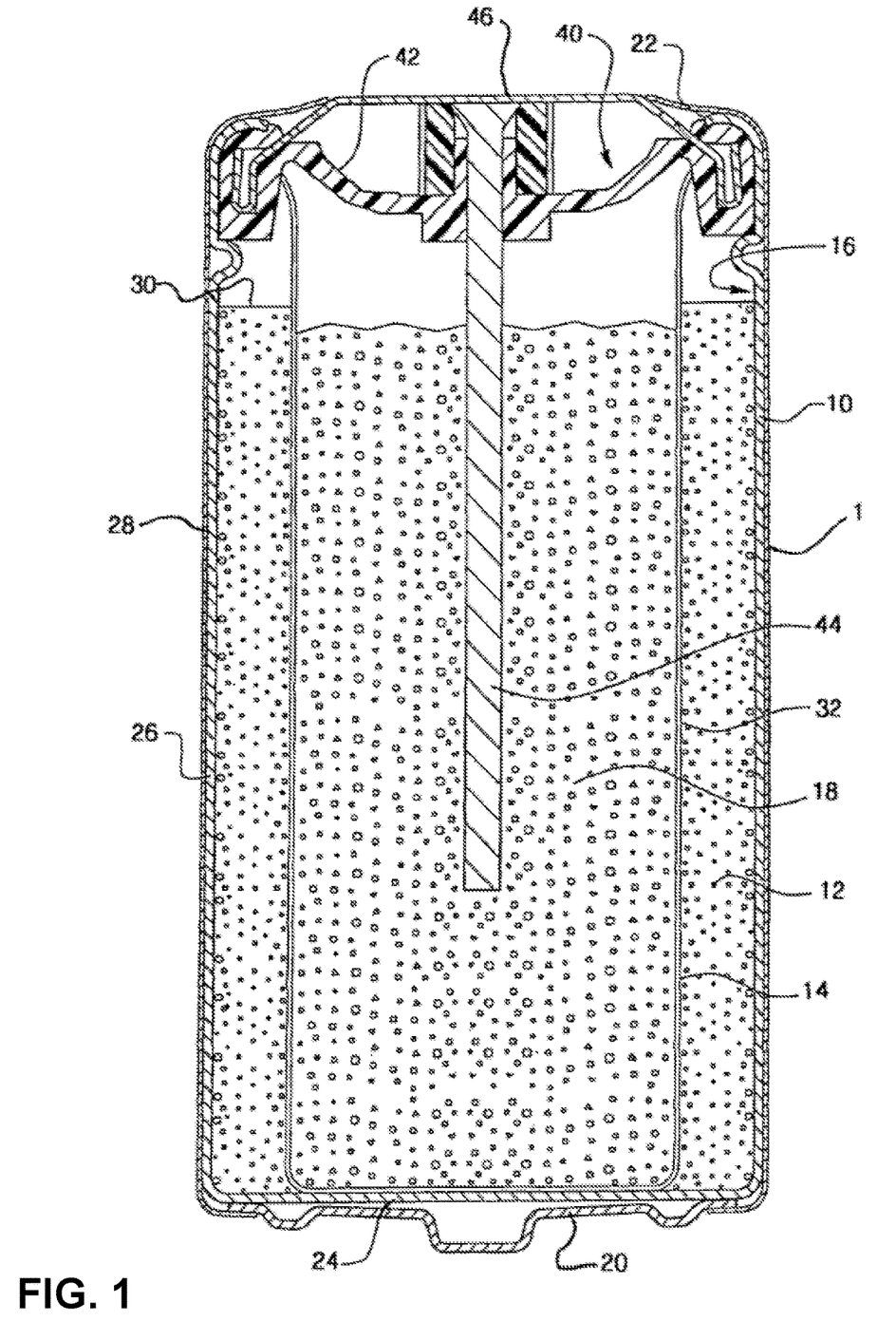
FIG. 1 is a cross-sectional elevational view of an alkaline electrochemical cell according to one embodiment.

FIG. 1 shows a cylindrical cell 1 in elevational cross-section, with the cell having a nail-type or bobbin-type construction and dimensions comparable to a conventional LR6 (AA) size alkaline cell. However, it is to be understood that cells according to various embodiments can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted.

The electrochemical cell 1 includes a container or can 10 having a closed bottom end 24, a top end 22, and sidewall 26 therebetween. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, which may be plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 may contain a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a hole (e.g., a centrally located hole) in closure member 42.

First electrode 18 may be a negative electrode or anode. The negative electrode includes a mixture of one or more active materials (e.g., zinc), an electrically conductive material, solid zinc oxide, and/or, in some embodiments, a surfactant. The negative electrode can optionally include other additives, for example a binder or a gelling agent, and the like.

Although the embodiment of FIG. 1 illustrates the first electrode 18 as having generally uniform characteristics, it should be understood that various embodiments comprise a non-uniform anode configuration. For example, the first electrode 18 may define a first anode portion (consisting of a first anode formulation) proximate a current collector 44 and a second anode portion (consisting of a second anode formulation) proximate the separator 14. The first anode portion and the second anode portion may define discrete regions defined by different characteristics that may be separated by a boundary region. The boundary region may be defined by a discrete boundary between adjacent anode compositions, or by a mixing region in which portions of each of the adjacent anode compositions mix, for example, as a result of processing steps for adding multiple anode compositions into discrete regions of the cell.

In certain embodiments, the boundary between adjacent anode compositions may be centered relative to the radius of the first electrode 18 (or the boundaries may be spaced equally along the radius of the first electrode 18 in embodiments comprising more than 2 anode compositions). However, the boundary between adjacent anode compositions may be skewed toward the separator 14 or the current collector 44 in certain embodiments. Differences in quantity between various anode compositions may be defined based on different characteristics, such as based on weight (e.g., weight percentage of the total weight of the first electrode 18), volume (e.g., a volume percentage of the total volume of the first electrode 18), thickness (e.g., a radial thickness percentage of the total thickness of the first electrode 18; in other words, a percentage of the length of the first electrode 18 radius), and/or the like. As an example, the weight of each anode composition (e.g., the first anode composition and the second anode composition) may be at least substantially equal. As another example, the volume of each anode composition (e.g., the first anode composition and the second anode composition) may be at least substantially equal. As yet another example, the thickness of each anode composition (e.g., the first anode composition and the second anode composition) may be at least substantially equal. It should be understood that more or less of a particular anode composition may be included within the first electrode 18 in certain embodiments (e.g., such that the weight, volume, or thickness of each anode composition is not equal). As one specific example, the quantity of the first anode composition may exceed the quantity of the second anode composition, by weight.

In certain embodiments, the anode compositions associated with each of the anode characteristics may be defined by differences in surfactant type included within respective anode compositions. For example, a first anode composition may comprise a first surfactant type and a second anode composition may comprise a second surfactant type. As a specific example, the first anode composition incorporating the first surfactant, which is incorporated in a portion of the first electrode 18 located adjacent the separator 14 may have a higher charge transfer resistance than the second anode composition incorporating the second surfactant and located in a portion of the first electrode 18 located adjacent the current collector 44. The first anode composition incorporating the first surfactant may also have a lower anode conductivity than the second anode composition incorporating the second surfactant. In such an example, the first anode composition may comprise a phosphate ester surfactant, and the second anode composition may comprise a sulfonate surfactant (e.g., an anionic sulfonate surfactant). It is the inventors' understanding that the inclusion of the phosphate ester surfactant (e.g., a nonionic phosphate ester surfactant) in the first anode composition causes the first anode composition to have a higher charge transfer resistance and lower conductivity than the second anode composition comprising the sulfonate surfactant. By including a low charge transfer resistance portion near the current collector 44 of the first electrode 18 and a high charge transfer resistance portion near the separator 14, the first electrode 18 discharges such that the portion nearer to the current collector 44 discharges first, and in doing so causes the formation of ZnO particles within the portion of the first electrode closest to the current collector 44 prior to the formation of ZnO particles closer to the separator 14. ZnO particles formed close to the separator 14 prior to complete discharge of the portions of the anode closer to the anode's interior may prevent or at least impede complete discharge of anode active material within the anode interior by blocking the diffusion of electrolyte across the separator 14. As mentioned, formulating the first electrode (anode) such that the portion of the anode near the current collector 44 discharges prior to the portion of the anode near the separator 14 ensures that undischarged active material within the first electrode is not blocked from discharge by the formation of ZnO proximate the separator 14. After the portion of the first electrode 18 closer to the current collector 44 and having a lower charge transfer resistance at least substantially discharges, the portion of the first electrode 18 located closer to the separator 14 and having a higher charge transfer resistance begins discharging.

In certain embodiments, a first, outer region of the anode (adjacent the separator 14) comprises the first anode composition incorporating the first surfactant, and a second, inner region (adjacent the current collector 44) comprises the second anode composition incorporating the second surfactant. There may be a discrete boundary between the first anode composition and the second anode composition, or there may be a small mixing region located at the boundary between the first anode composition and the second anode composition, wherein the mixing region comprises both the first surfactant and the second surfactant.

As discussed in co-pending U.S. patent application Ser. No. 15/896,917, filed on Feb. 14, 2018, the contents of which are incorporated herein by reference in their entirety, other characteristics may vary between the first anode portion and the second anode portion. For example, the varying characteristics may be average particle size of an active material (e.g., zinc), average active material alloy composition, average concentration of an active material, average concentration of an additive, average concentration of a surfactant, and/or the like. As non-limiting examples, the relative composition of active material as a percentage of the total composition of the first electrode 18 may vary along the radius of the first electrode 18 (e.g., between the outer surface and the inner portion of the first electrode 18); one or more active material particle characteristics (e.g., particle size, surface roughness, porosity, and/or the like) may vary along the radius of the first electrode 18; the active material alloy type may vary along the radius of the first electrode, the surfactant type may vary along the radius of the first electrode, the relative composition of surfactant as a percentage of the total composition of the first electrode 18 may vary along the radius of the first electrode 18; one or more particle characteristics of one or more inactive materials may vary along the radius of the first electrode 18; and/or the like.

In various embodiments, multiple characteristics may change along the radius of the anode to form a multiple characteristics gradient anode composition. For example, the average particle size of the active material within the anode may change along the radius of the anode and the surfactant type may also change along the radius of the anode. Any of a variety of combinations of anode characteristic changes are envisioned to provide an anode having desirable characteristics. As a specific example, an anode may comprise a first surfactant type in a region of the anode proximate the separator and a first average active material particle size in the region of the anode proximate the separator; and a second surfactant type and a second average active material particle size in a region of the anode proximate the current collector. Such a configuration may desirably provide a lower charge transfer resistance in the region closer to the current collector 44, which may increase high-rate discharge service while minimizing gassing in the region near the current collector 44.

Figure 2:
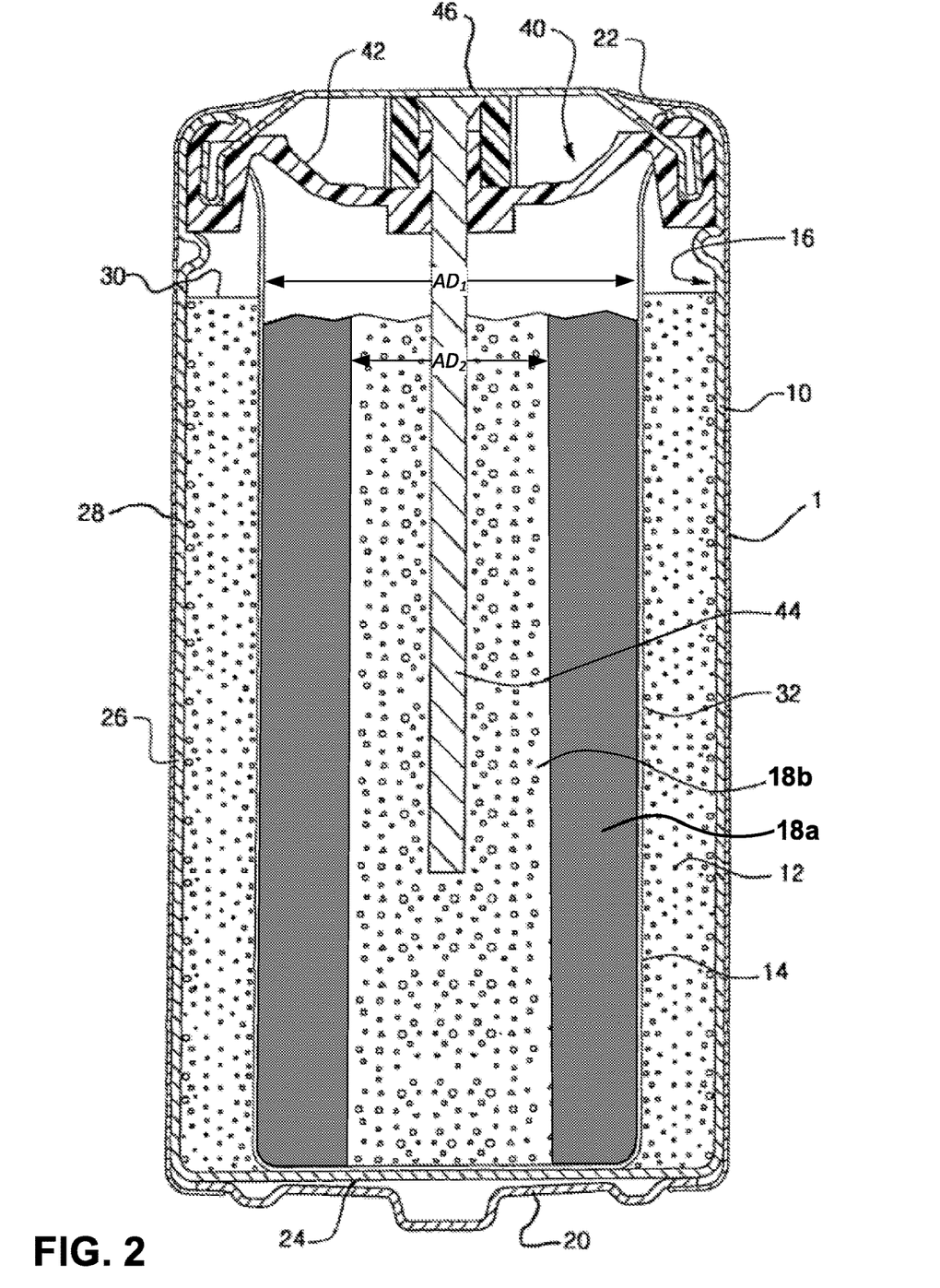
FIG. 2 is a cross-sectional elevational view of an alkaline electrochemical cell according to one embodiment.

In certain embodiments, the anode may be defined by two or more discrete regions, wherein each region has consistent material characteristics therein. The discrete regions may be formed simultaneously and/or in series. For example, as shown in FIG. 2, which is a side cross-sectional view of an electrochemical cell according to various embodiments, the first electrode 18 may comprise a first portion 18a and a second portion 18b. As shown in FIG. 2, the first portion 18a may be located between the outer surface of the first electrode 18 and the second portion 18b. Accordingly, the second portion may be located between the first portion 18a and the inner portion of the first electrode 18 (e.g., adjacent the current collector 44). Thus, the first portion 18a may define a hollow tubular shape defining an exterior surface coexistent with the exterior surface of the first electrode 18, and an interior surface surrounding an open interior of the first portion 18a. The second portion 18b may be positioned within the interior opening of the first portion 18a, such that the second portion 18b defines an exterior surface located adjacent the interior surface of the first portion 18a, and an interior portion coexistent with the interior portion of the first electrode 18. In various embodiments, the interface between the first portion 18a and the second portion 18b (defined between the exterior surface of the second portion 18b and the interior surface of the first portion 18a) may define a discrete boundary between the first portion and the second portion. However, in certain embodiments, the interface between the first portion 18a and the second portion 18b may be defined by a mixing region defined by intermixing between the first portion 18a and the second portion 18b.

In certain embodiments, the first portion 18a may define between about 20 wt %-80 wt % of the total weight of the first electrode 18, and the second portion 18b may define between about 20 wt %-80 wt % of the total weight of the first electrode 18. In example embodiments as discussed herein, the weight of the first anode portion 18a may exceed the weight of the second anode portion 18b.

Although not shown in FIG. 2, the first electrode 18 of various embodiments may comprise more than two discrete portions. The additional portions may be located between the first portion 18a and the second portion 18b, thereby forming a series of rings (e.g., concentric rings) surrounding the second portion 18b and within the first electrode 18. As will be discussed in greater detail herein, the various discrete portions of the first electrode 18 may be coextruded into the electrochemical cell, the various discrete portions may be extruded into the electrochemical cell in series, and/or the like.

As just one example, the surfactant within the first portion 18a may be different than the surfactant within the second portion 18b. Specifically, the surfactant within the first portion 18a may cause the first portion to have a higher charge transfer resistance and lower anode conductivity than the second portion 18b. In certain embodiments, the surfactant within the first portion 18a is a phosphate ester surfactant and the surfactant within the second portion 18b is a sulfonate surfactant. As another example, a nonionic surfactant may be used in one of the first portion 18a or the second portion 18b, and an anionic surfactant may be used in the other portion of the anode. Specifically, a first surfactant having a first affinity for adhering to zinc particles may be provided in the first portion 18a and a second surfactant having a second affinity for adhering to zinc particles (e.g., a lower affinity for adhering to zinc particles) may be provided in the second portion 18b. Such a gradient of surfactant types may enable zinc plating onto the current collector 44, thereby decreasing off-gassing, while providing highly active surfactant within the region of the anode having the highest concentration of zinc oxidation during high-rate discharge.

As another example, the average particle size of the active anode material (e.g., zinc) within the first portion 18a may be larger than the average particle size of the active anode material within the second portion 18b. As another example, the average quantity of active material within the first portion 18a may be greater than the average quantity of active material within the second portion 18b (e.g., measured as a weight-percentage of the active material relative to the total weight of the respective first electrode portion; measured as a volume-percentage of the active material relative to the total weight of the respective first electrode portion; and/or the like). As yet another example, the average quantity of surfactant within the second portion 18a may be greater than the average quantity of surfactant within the second portion 18b (e.g., measured as a weight-percentage of the surfactant relative to the total weight of the respective first electrode portion; measured as a volume-percentage of the surfactant relative to the total weight of the respective first electrode portion; and/or the like).

As yet another example, the type of active material utilized in the first portion 18a may be different than the type of active material utilized in the second portion 18b (e.g., different grades of zinc may be used; zinc purchased from different suppliers may be used; zinc retrieved from different zinc mines may be used; zinc having different average porosity may be used; zinc having different surface roughness characteristics may be used; active materials having different alloy compositions may be used (e.g., different alloys may be used in different anode portions, those alloys may be selected from the non-limiting examples of zinc-bismuth alloys, zinc-indium alloys, zinc-aluminum alloys, and/or the like), and/or the like). As a specific example, a zinc alloy known to be highly reactive may be included in the first portion 18a and a zinc known to be less reactive may be included in the second portion 18b to increase high-rate service (in which zinc reactivity is generally concentrated near the separator) while decreasing off-gassing in the region proximate the current collector 44.

Zinc suitable for use in various embodiments may be purchased from a number of different commercial sources under various designations, such as BIA 100, BIA 115. Umicore, S. A., Brussels, Belgium is an example of a zinc supplier. In a preferred embodiment, the zinc powder generally has 25 to 40 percent fines less than 75 microns, and specifically 28 to 38 percent fines less than 75 microns. Generally lower percentages of fines will not allow desired high rate service to be realized and utilizing a higher percentage of fines can lead to increased gassing. A correct zinc alloy is needed in order to reduce negative electrode gassing in cells and to maintain test service results.

In certain embodiments, the amount of zinc present in the negative electrode ranges generally from about 62 to about 78 weight percent, desirably from about 64 to about 74 weight percent, and specifically about 68 to about 72 weight percent based on the total weight of the negative electrode, i.e., zinc, solid zinc oxide, surfactant and gelled electrolyte.

The solid zinc oxide utilized in various embodiments may be highly active in order to increase high rate service such as Digital Still Camera (DSC) service, as well as to increase anode rheology and reduce DSC service variability.

The solid zinc oxide added to the anode specifically has high purity and includes low levels of impurities that can result in higher zinc gassing and lowered service. The solid zinc oxide specifically contains less than 30 ppm iron, less than 3 ppm of silver and arsenic, less than 1 ppm of each of copper, nickel, chromium and cadmium, less than 0.50 ppm each of molybdenum, vanadium and antimony, less than 0.1 ppm tin and less than 0.05 ppm germanium.

In various embodiments, a surfactant added to one or more portions of the first electrode 18 may be either a nonionic or anionic surfactant, or a combination thereof. For example, as noted above, a nonionic surfactant may be added to one portion of the first electrode 18 and an anionic surfactant may be added to another portion of the first electrode 18. It has been found that anode viscosity is increased during discharge by the addition of solid zinc oxide alone, but is mitigated by the addition of the surfactant. The addition of the surfactant increases the surface charge density of the solid zinc oxide and lowers anode viscosity as indicated above. Accordingly, adding surfactant to a portion of the anode (e.g., a discrete portion of the anode and/or varying the concentration of the surfactant within the anode) or adding different surfactants within different portions of the anode may create a charge distribution gradient within the anode.

Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the addition of surfactant results in enhanced surface charge density of solid zinc oxide particle surface. The higher the Brunauer-Emmett-Teller (BET) surface area of solid zinc oxide, the more surfactant can be adsorbed on the solid zinc oxide surface.

Moreover, the inventors have found that differences in surfactant chemistries may create differences in the anode charge transfer resistance and anode conductivity of the anode. As specific examples, the inventors have found that an anode composition comprising a phosphate ester surfactant (e.g., nonionic phosphate ester surfactant) has a higher charge transfer resistance and lower anode conductivity than an anode composition comprising a sulfonate surfactant (e.g., anionic sulfonate surfactant). When multiple anode compositions having differences in charge transfer resistance are included within a single cell, the portion of the anode having the lower charge transfer resistance discharges first, before other portions of the anode. Thus, including a first anode composition comprising a phosphate ester surfactant (e.g., a nonionic phosphate ester surfactant) and a second anode composition comprising a sulfonate surfactant (e.g., an anionic sulfonate surfactant) within a single cell (e.g., within corresponding portions of an anode) causes the second anode composition to discharge before the first anode composition.

Given this understanding, anodes according to various embodiments comprise a plurality of anode compositions, and an anode composition located closest to the current collector 44 has a lower charge transfer resistance than an anode composition located closest to the separator 14. In such embodiments, the anode composition located closest to the current collector 44 discharges prior to the anode composition located at the separator 14, thereby preventing a premature formation of a zinc oxide barrier adjacent to the separator 14, which may impede further discharge of anode active material located closer to the current collector 44.

The aqueous alkaline electrolyte comprises an alkaline metal hydroxide such as potassium hydroxide (KOH), sodium hydroxide, or the like, or mixtures thereof. The alkaline electrolyte used to form the gelled electrolyte of the negative electrode contains the alkaline metal hydroxide in an amount from about 26 to about 36 weight percent, desirably from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent may be utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount or gelling agent present is chosen so that lower rates of electrolyte separation are obtained and anode viscosity in yield stress are not too great which can lead to problems with anode dispensing.

Other components which may be optionally present within one or more portions of the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide may be present via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 m2/g or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

Example Nozzle

FIGS. 3A-5 illustrate various schematic views of an example nozzle 300 utilized to provide an electrode material (e.g., an anode material) within an interior opening of an electrochemical cell 1 formed by a second electrode 12 (e.g., a cathode) and separator 14. Specifically, the nozzle 300 configurations illustrated with respect to FIGS. 3A-5 are configured to form a hollow tubular electrode portion 18a (referred to herein as a first portion 18a of the first electrode) adjacent an interior wall of the separator 14, wherein the first portion 18a defines an interior opening extending along the length of the first portion 18a and configured to accept a second portion 18b therein (it should be understood that additional portions may be provided within the interior opening of the first portion 18a, for example, in embodiments comprising more than 2 discrete anode portions). As shown with reference to FIG. 2, the first portion 18a may have an outer diameter $AD_1$ that substantially matches the inner diameter of the separator 32, and the first portion may additionally have an inner diameter $AD_2$ defining a diameter of the interior opening and at least substantially matching the outer diameter of the second portion 18b.

Figure 3A:
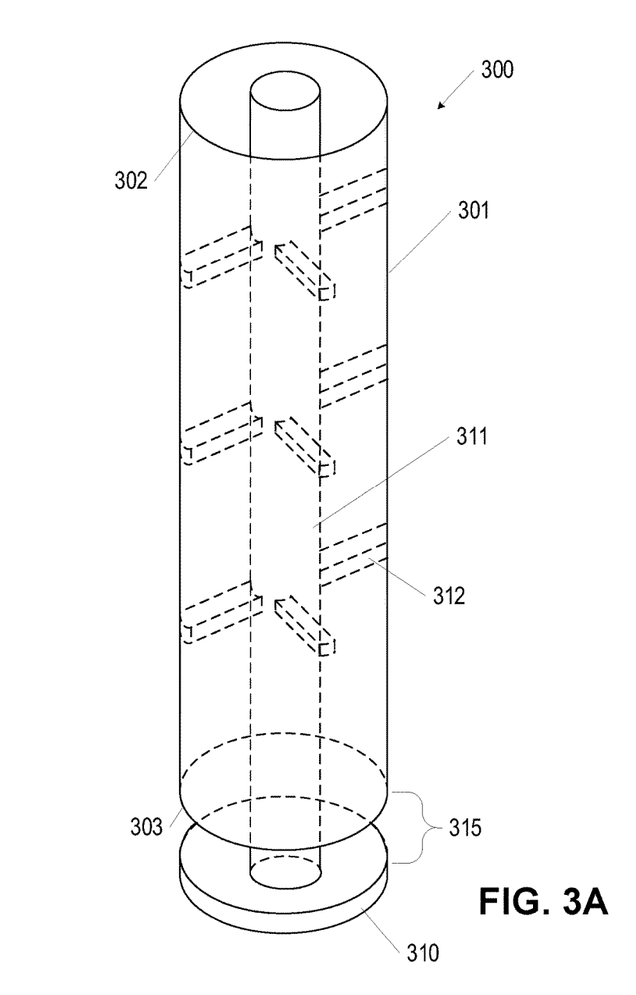
FIGS. 3A-3D illustrate schematic figures of an extrusion die in accordance with certain embodiments.
Figure 3B:
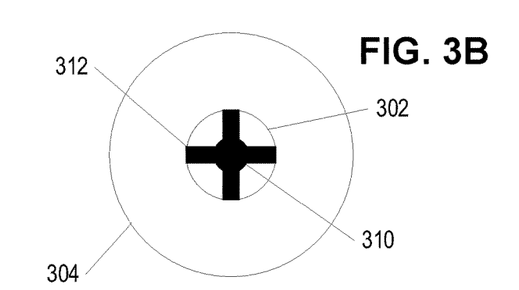
Figure 3C:
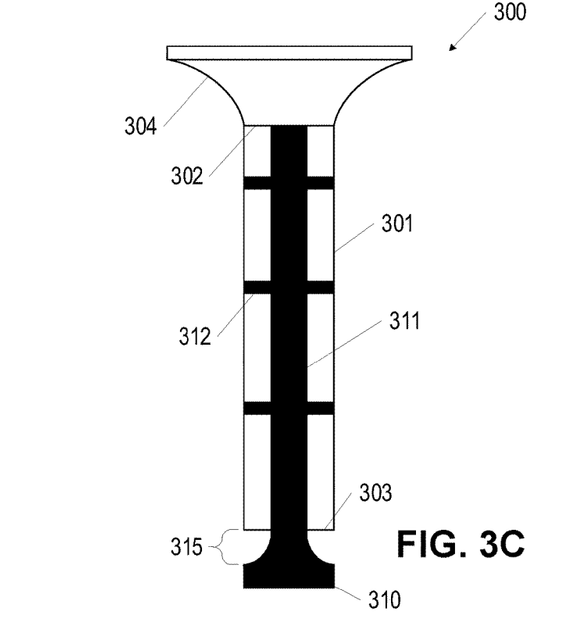

As shown specifically in reference to FIGS. 3A-3C, the nozzle 300 comprises a hollow tubular body 301 having a length corresponding to an expected length of an electrochemical cell 1 to be filled with an electrode material (e.g., an anode material) utilizing the nozzle 300. For example, the hollow tubular body 301 may have a length at least as long as an expected electrochemical cell 1 to be filled with electrode material utilizing the nozzle 300, such that the nozzle 300 may extend along an entire interior height of the electrochemical cell 1 during use. The hollow tubular body 301 additionally defines an outer diameter (measured between opposite points on an outer surface of the hollow tubular body 301) and an inner diameter (measured between opposite points on an inner surface of the hollow tubular body 301). By extension, walls of the hollow tubular body 301 have a wall thickness of half the difference between the outer diameter and the inner diameter of the hollow tubular body 301.

Moreover, the hollow tubular body 301 of the illustrated embodiments has a cross-sectional shape and size corresponding to the cross-sectional shape and size of the interior opening of the first portion 18*a* of the first electrode (e.g., the anode). Specifically, in the illustrated embodiment the hollow tubular body 301 has a circular exterior cross-sectional shape and having an outside diameter corresponding to the interior diameter of the interior opening of the first portion 18*a*. In certain embodiments, the outside diameter of the hollow tubular body 301 may be at least approximately 0.242" for use in forming a LR6 (AA) electrochemical cell. It should be understood that other outside diameter dimensions may be provided in other embodiments, and/or for other electrochemical cell sizes. However, it should be understood that the hollow tubular body 301 may have any of a variety of shapes and sizes and need not correspond to the size and shape of the interior opening of the first portion 18*a* in certain embodiments, in light of the size and positioning of the lower deflector 310 discussed herein. By extension and as discussed in greater detail herein, the outside diameter of the hollow tubular body 301 need not be equal to the diameter of the lower deflector 310, and the lower deflector 310 may be utilized to establish the inner diameter $AD_2$ of the first portion 18*a* as the material of the first portion 18*a* is provided to an interior of the cell. For example, the outside diameter of the hollow tubular body 301 may be smaller than a diameter of the lower deflector 310.

The hollow tubular body 301 extends between an open upper end 302 (configured to accept anode material of the first anode portion 18*a* therein) and an open lower end 303 (configured to expel anode material of the first anode portion 18*a* therefrom). At the open upper end 302, the nozzle 300 may be connected with a conduit supplying the anode material of the first anode portion 18*a*, for example, via a connector 304 as shown in the figures. As shown, the connector 304 may be configured to adapt a size of the conduit to a size of the nozzle 300. However, it should be understood that other connecting configurations may be utilized in certain embodiments.

As shown in the illustrated embodiments of FIGS. 3A-3C, the nozzle 300 additionally comprises a lower deflector 310 spaced apart from an open lower end 303 of the hollow tubular body 301. The lower deflector 310 may define a deflection surface (e.g., an upper surface of the lower deflector 310) configured to redirect a flow of electrode material expelled from the lower end 303 of the hollow tubular body 301, for example, from a direction at least substantially parallel with a length of the hollow interior body 301 to a direction at least substantially perpendicular with the length of the hollow interior body 301, such that the electrode material (e.g., anode material) is extruded at least substantially radially from the nozzle 300, such that the electrode material is extruded against sidewalls of the separator 14 of the electrochemical cell 1. As shown in FIG. 3A, the deflection surface may be embodied as an at least substantially planar surface oriented at least substantially perpendicular to a length of the hollow tubular body 301. FIG. 3C illustrates another example embodiment in which the deflection surface is embodied as a curved (e.g., having a concave curvature) surface to redirect the electrode material (e.g., anode material) towards the outside of the nozzle 300. Other embodiments may utilize a chamfered deflection surface or another deflection surface shape.

Moreover, the lower deflector 310 has a cross-sectional shape corresponding with the shape of the interior opening of the first portion 18*a* of the first electrode (e.g., the anode). Thus, as electrode material is extruded from the nozzle 300 and against the sidewalls of the separator 14, the lower deflector 310 operates as a mold portion against which the electrode material may flow and form. Accordingly, the ring-shaped first portion 18*a* of the first electrode (or other shapes, defined at least in part by the cross-sectional shape of the interior opening of the second electrode 12 and the cross-sectional shape of the lower deflector 310) is formed between the separator 14 and the exterior side-surface(s) of the lower deflector 310. The height of the lower deflector 310 may be optimized to enable a sufficient height of electrode material to be extruded to enable formation of a structurally stable ring-shape of the first portion 18*a* of the first electrode prior to movement of the nozzle 300 as discussed herein. In certain embodiments, the diameter of the lower deflector 310 may be larger than the resulting inner diameter $AD_2$ of the first portion 18*a* as the electrode material of the first portion 18*a* may settle depending on the viscosity of the electrode material of the first portion 18*a*. Accordingly, the diameter of the lower deflector 310 may be selected based at least in part on a desired inner diameter $AD_2$ of the first portion 18*a* and on a known viscosity of the electrode material of the first portion 18*a*. As just one example, the lower deflector 310 may have a diameter of between about 0.240" to about 0.275". when forming a first portion 18*a* with a high-viscosity anode material, the lower deflector 310 may have a diameter at least substantially equal to the inner diameter $AD_2$ of the first portion 18*a*. In such embodiments, the lower deflector 310 may have a diameter of at least about 0.242" to form inner diameter $AD_2$ of the first portion 18*a* of at least approximately 0.242" for an LR6 electrochemical cell. However, when utilizing an anode material of a lower viscosity, the diameter of the lower deflector 310 may be larger than the resulting inner diameter $AD_2$ of the first portion 18*a*. In such embodiments, a lower deflector 310 may have a diameter between about 0.245" to about 0.275" to form an inner diameter $AD_2$ of the first portion 18*a* of at least about 0.242" for an LR6 size electrochemical cell. As discussed herein, the diameter of the lower deflector 310 may be larger than an outside diameter of a hollow tubular body 301. For an electrochemical cell having an outer diameter $AD_1$ of the first portion 18*a* of 0.301", the first potion 18*a* has a thickness of at least approximately 0.0295".

Figure 3D:
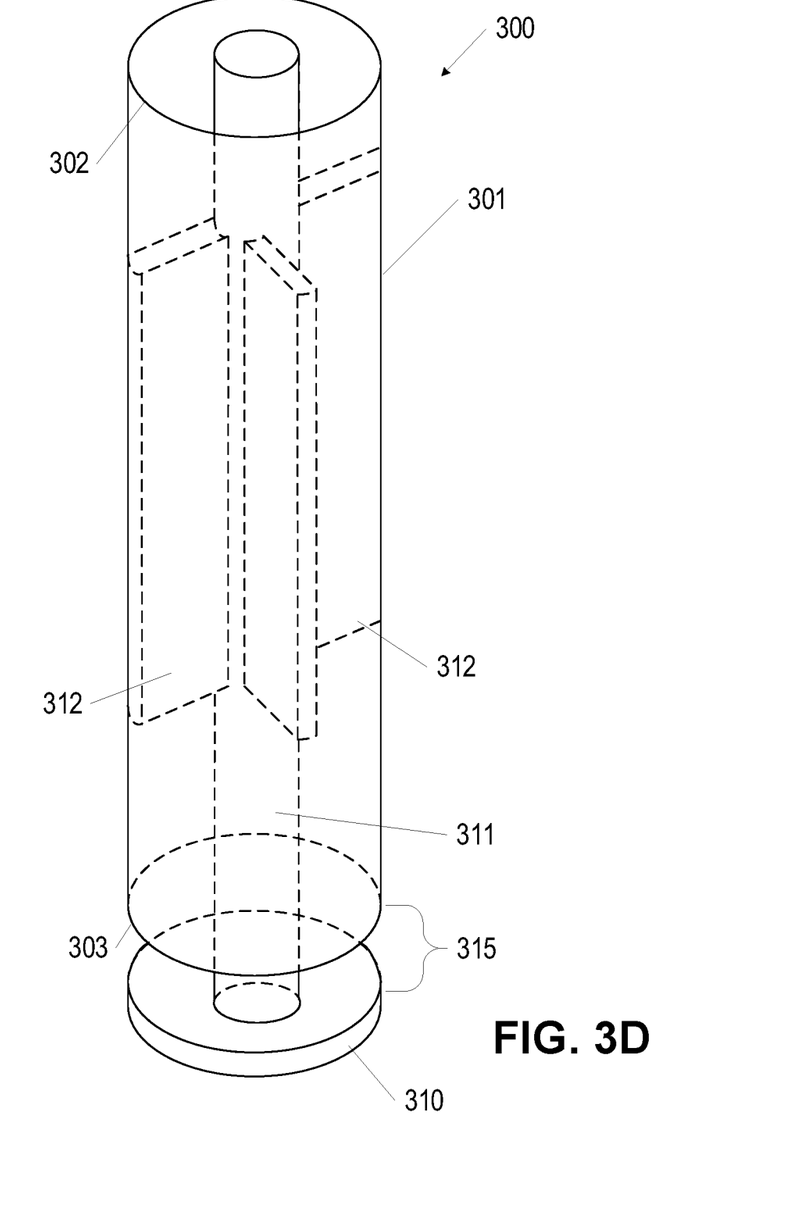

In the illustrated embodiment, the lower deflector 310 is supported by a support rod 311 suspended within the interior of the hollow tubular body 301 by a plurality of support trusses 312 each extending from an interior wall of the hollow tubular body 301 to an exterior surface of the support rod 311. Each support truss 312 may be sufficiently thin and/or small in cross-sectional shape so as to cause minimal or no impact on the flow of electrode material through the hollow tubular body 301. As shown in the embodiment of FIG. 3A, a plurality of support trusses 312 may be aligned vertically along the length of the hollow tubular body 301 at various radial locations around the interior of the hollow tubular body 301. For example, the support trusses 312 may be positioned at three radial locations (e.g., spaced at least substantially equally around the interior) of the hollow tubular body 301. FIG. 3D illustrates an alternative embodiment incorporating elongated support trusses 312 spaced at radial locations positioned at least substantially equally around the interior of the hollow tubular body 301. For example, a single elongated support truss 312 may be positioned at each radial position within the interior of the hollow tubular body 301. In certain embodiments, each of the elongated support trusses 312 may extend between an upper open end of the hollow tubular body 301 to a lower open end of the hollow tubular body 301. However, as shown in FIG. 3D, the elongated support trusses 312 at each radial location may extend along only a portion of a length of the hollow tubular body 312.

Moreover, in certain embodiments, the lower deflector 310 may be detachably secured to the support rod 311 (e.g., via a threaded interface), thereby allowing different diameter lower deflectors 310 to be secured onto an end of the nozzle 300 to accommodate different electrochemical cell sizes, to accommodate different desired inner diameter $AD_2$ sizes of the first anode portion 18a, to accommodate different anode material viscosities, and/or the like.

The support rod 311 extends at least partially along the length of the hollow tubular body 301 and supports the lower deflector 310 at a distance away from the open lower end 303 of the hollow tubular body 301 to define an annular gap 315 between the deflection surface of the lower deflector 310 and the open lower end 303 of the hollow tubular body 301. Electrode material (e.g., anode material) passed through the nozzle 300 move along the length of the hollow interior body 301 from the open upper end 302 to the open lower end 303 and is deflected out of the nozzle 300 through the annular gap 315. In certain embodiments, the annular gap 315 has a height between the open lower end 303 of the hollow tubular body 303 and the lowest point of the deflection surface of the lower deflector 310 that is optimized for providing electrode material into the electrochemical cell as the nozzle 300 is moved so as to form a structurally stable first portion 18a of the first electrode while still enabling a smooth flow of electrode material through the nozzle 300. In other embodiments, the height of the annular gap 315 may be adjustable to enable optimization of the height of the annular gap 315 during use. In certain embodiments, the annular gap 315 has a height of between about 0.080" to about 0.125", such as between about 0.090" to about 0.124". The height of the annular gap 135 may be adjusted to adjust the pressure and/or flow rate of the electrode material being provided to form the first portion 18a, which may impact the amount of settling of the electrode material of the first portion 18a after providing the same to the electrochemical cell.

Although not shown, the nozzle 300 may have an associated linear actuator configured to move the nozzle 300 at least substantially linearly (e.g., vertically within the electrochemical cell 1 as electrode material is passed through the nozzle 300. As discussed herein, the nozzle 300 may be initially placed such that a bottom surface of the lower deflector 310 is contacting or at least proximate a bottom surface of the interior opening of the electrochemical cell 1. As electrode material (e.g., anode material) is passed through the nozzle 300, the nozzle 300 is retracted upward while electrode material is continually passed through the nozzle 300 and extruded against the sidewalls of the separator 14. As the nozzle 300 moves upward, the sidewalls of the lower deflector 310 form an interior surface of the first portion 18a of the first electrode that surrounds an interior opening of the first portion 18a of the first electrode (e.g., anode) that may be filled with the second portion 18b (and/or additional portions) of the first electrode (e.g., anode) with an at least substantially simultaneous or consecutive processing step as discussed herein. The speed at which the nozzle 300 is retracted from the interior of the electrochemical cell may be optimized to as to ensure the electrode material of the first portion 18a sets sufficiently to avoid excessive settling during movement of the nozzle 300, which may lead to unpredictable or excessive settling of the first anode portion 18a.

Figure 5:
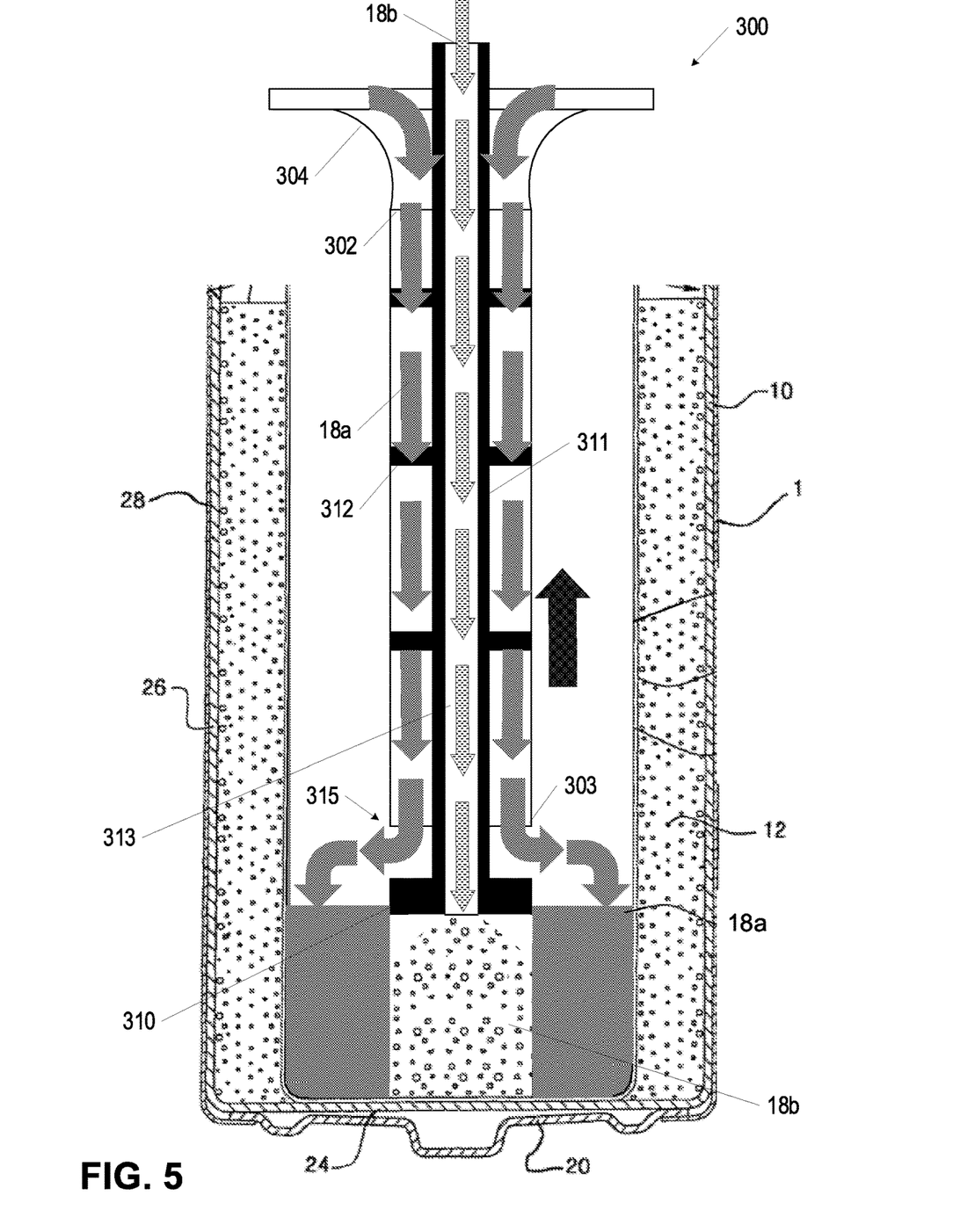
FIG. 5 schematically illustrates the functionality of an alternative extrusion die in accordance with certain embodiments.

With brief reference to FIG. 5, in certain embodiments the support rod 311 and lower deflector 310 define an interior conduit 313 through which an additional electrode material (also referred to herein as a second electrode material, which may be embodied as, for example, a second anode material) corresponding to the second portion 18b may be extruded. Through such a configuration, the first portion 18a and second portion 18b of the first electrode may be formed at least substantially simultaneously, with a single formation tool. Specifically, the electrode material (e.g., anode material) of the first portion 18a may be provided between the support rod 311 and the hollow tubular body 301 while the second electrode material (e.g., second anode material) of the second portion 18b flows through the hollow interior of the support rod 311. Such embodiments may increase production speeds associated with generating multi-part inner electrodes (e.g., multi-part anodes). Moreover, providing the second portion 18b of the electrode simultaneously with the first portion 18a of the electrode may inhibit settling of the first portion 18a, as the second portion 18b is present to counteract settling of the first portion 18a.

Example Method of Manufacture

As mentioned briefly herein, the one or more portions of the anode (e.g., a first portion 18a of a first electrode 18; a second portion 18b of the first electrode 18; and/or the entirety of the first electrode 18) may be extruded to form the first electrode within the electrochemical cell. In certain embodiments, various portions of the first electrode 18 may be co-extruded (e.g., by simultaneously or successively extruding separate portions of the first electrode 18 via a nozzle 300 configured in accordance with the illustration of FIG. 5), extruded in series (extruding a first portion 18a of the first electrode 18 utilizing a nozzle 300 configured in accordance with FIGS. 3A-4, retracting the nozzle 300 out of an interior opening formed in the first portion 18a, and then extruding the second portion 18b of the first electrode 18 into the interior opening created by the removal of the nozzle 300, for example, via a separate nozzle).

Figure 4:
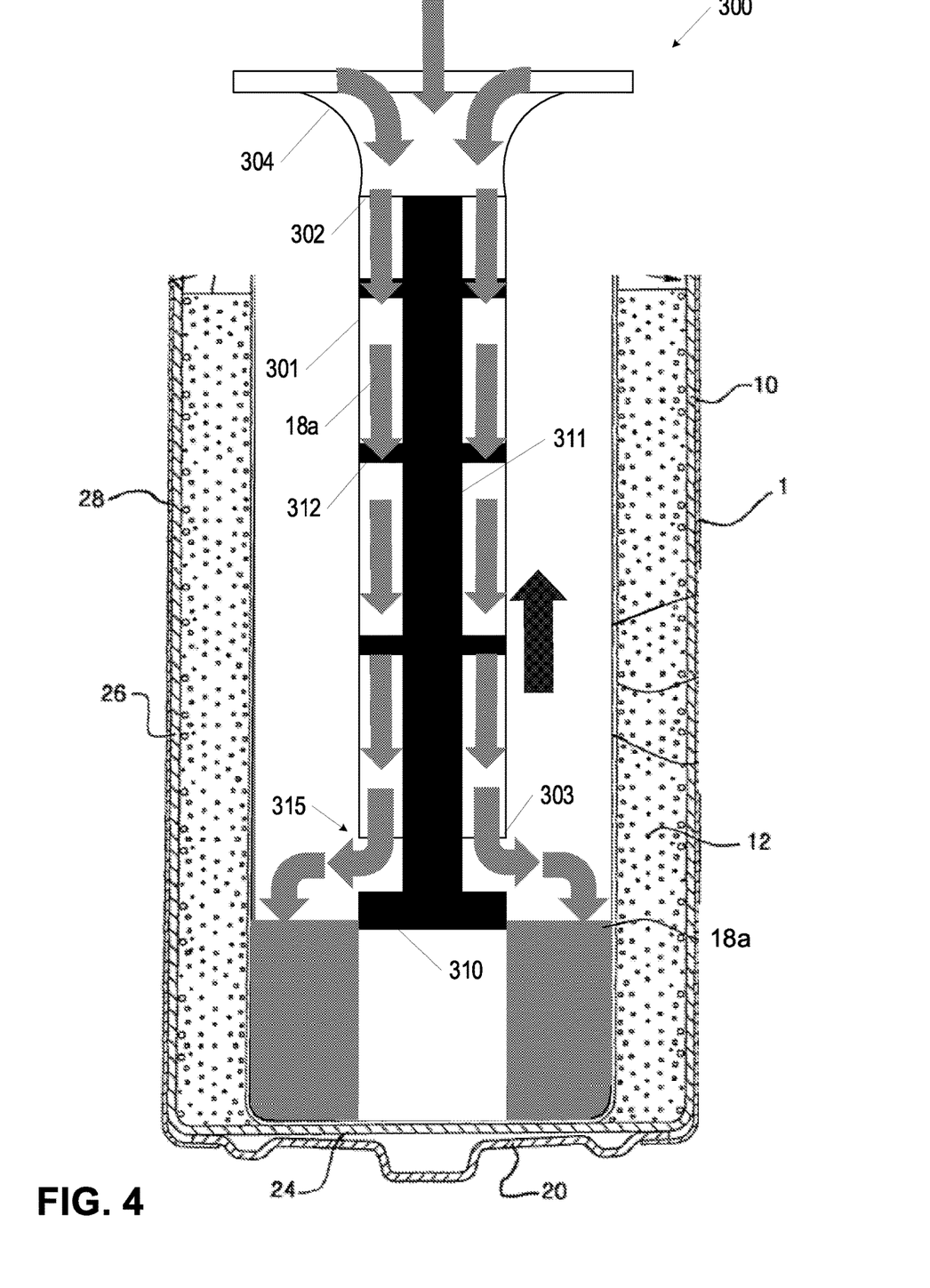
FIG. 4 schematically illustrates the functionality of an extrusion die in accordance with certain embodiments.

Specifically, to form the first portion 18a of the first electrode in accordance with methods according to various embodiments, the nozzle 300 is first inserted into the opening formed by the second electrode 12 and the separator 14, to a first position in which a bottom surface of the lower deflector 310 is positioned against a bottom surface of the opening (e.g., a bottom wall of the separator 14). Once the nozzle 300 is at the first position, the electrode material of the first portion 18a of the first electrode 18 (e.g., anode material utilized to form the first portion of the anode) is passed through the hollow tubular body 301 of the nozzle 300 and out the annular opening 15. As the electrode material continues flowing through the hollow tubular body 301 and out the annular opening 15, the nozzle 300 is retracted (e.g., slowly retracted) out of the electrochemical cell 1 at a rate determined based at least in part on the rate of extrusion (e.g., the fluid pressure and/or flowrate) of the electrode material through the nozzle 300, as illustrated in FIG. 4. As the electrode material is extruded into the electrochemical cell 1 to form the first portion 18a, the level of the electrode material within the electrochemical cell 1 rises (and an upper surface of the first portion 18a of the first electrode (e.g., anode) continues to rise). The rate of retraction of the nozzle 300 is maintained such that the rising upper surface of the first portion 18a of the first electrode remains above the bottom surface of the lower deflector 310. For example, the rising upper surface of the first portion 18a remains aligned with a sidewall of the lower deflector 310 or the rising upper surface of the upper portion 18a remains above a deflection surface of the lower deflector 310. Due at least in part to the viscosity of the first electrode 18 material, the first portion 18a maintains a tubular shape having an open interior as the nozzle 300 (and the lower deflector 310) is retracted.

Once a desired quantity of electrode material is provided into the electrochemical cell 1 via the nozzle 300, the flow of electrode material is stopped, and the nozzle 300 is fully retracted from the interior of the electrochemical cell 1. In those embodiments in which the nozzle 300 is configured for providing only the electrode material of the first portion 18a, a separate nozzle (not shown) may be utilized to fill the internal opening of the first portion 18a with the second electrode material of the second portion 18b.

In other embodiments, such as embodiments having a configuration as shown in FIG. 5, the second electrode material of the second portion 18b may be provided via conduit 313, as the nozzle 300 is retracted, thereby filling the internal opening of the first portion 18a to form the second portion 18b of the electrode at least substantially simultaneously with the formation of the first portion 18a.

In one embodiment, the zinc and solid zinc oxide powders, and other optional powders other than the gelling agent, are combined and mixed. In certain embodiments, the zinc and solid zinc oxide powders may be mixed in separate batches corresponding to various portion of the first electrode 18 (e.g., the anode). For example, first zinc and zinc oxide powders may be mixed to form a first batch and second zinc and zinc oxide powers may be mixed to form a second batch (e.g., comprising a zinc powder having a different average zinc particle size than the zinc powder of the first batch).

Afterwards, a surfactant may be introduced into the mixture containing the zinc and solid zinc oxide (e.g., the surfactant may be introduced into each of the various batches). A pre-gel comprising alkaline electrolyte, soluble zinc oxide and gelling agent, and optionally other liquid components, may be introduced to the surfactant, zinc and solid zinc oxide mixture(s) which are further mixed to obtain a substantially homogenous mixture (e.g., homogeneous within each batch) before addition to the cell. In various embodiments, one or more component of each batch may be varied to provide a desired anode characteristics difference between each batch (e.g., providing a different quantity of surfactant; providing a different zinc grade; providing a different zinc oxide quantity; and/or the like).

In a further embodiment, the solid zinc oxide is pre-dispersed in a negative electrode pre-gel comprising the alkaline electrolyte, gelling agent, soluble zinc oxide and other desired liquids, and blended, such as for about 15 minutes. As mentioned above, multiple batches may be provided, each comprising the solid zinc oxide, the alkaline electrolyte, gelling agent, soluble zinc oxide and other desired liquids. In certain embodiments, each batch may comprise a different composition of the combined components, as mentioned above. The solid zinc and surfactant are then added and each batch of the first electrode composition is blended for an additional period of time, such as about 20 minutes. The amount of gelled electrolyte utilized in each batch of the first electrode composition (e.g., the anode composition) is generally from about 25 to about 35 weight percent. For example, the amount of gelled electrolyte may be about 32 weight percent based on the total weight of each batch of first electrode composition. Volume percent of the gelled electrolyte may, in certain embodiments, be about 70% based on the total volume of the first electrode. In addition to the aqueous alkaline electrolyte absorbed by the gelling agent during the first electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is added. As discussed herein, the free electrolyte added prior to addition of the negative electrode may comprise a surfactant composition that is later absorbed by the negative electrode, thereby forming a surfactant concentration gradient within at least a portion of the negative electrode. The remaining portion of the 29 weight percent KOH solution is injected into the separator lined cavity after the negative electrode has been inserted.

Second electrode 12, also referred to herein as the positive electrode or cathode, may include manganese dioxide as the electrochemically active material. Manganese dioxide is present in an amount generally from about 80 to about 86 weight percent, such as from about 81 to 85 percent by weight based on the total weight of the positive electrode, i.e., manganese dioxide, conductive material, positive electrode electrolyte and additives such as barium sulfate. Manganese dioxide is commercially available as natural manganese dioxide (NMD), chemical manganese dioxide (CMD), or electrolytic manganese dioxide (EMD). The preferred manganese dioxide for use in a cell is EMD. Suppliers of EMD include Tronox Ltd. of Stamford, Conn.; Tosoh Corporation of Tokyo, Japan, and Erachem Comilog, Inc. of Baltimore, Md. The positive electrode is formed by combining and mixing desired components of the mixture followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising manganese dioxide and then inserting the rings into the container to form the tubular-shaped second electrode. The cell shown in FIG. 1 would typically include 3 or 4 rings.

The positive electrode can include other components such as a conductive material, for example graphite, that when mixed with the manganese dioxide provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded.

Suppliers of graphite for use in alkaline batteries include Imerys Graphite & Carbon in Bironico, Switzerland and Superior Graphite in Chicago, Ill. Conductive material is present generally in an amount from about 5 to about 10 weight percent based on the total weight of the positive electrode. Too much graphite can reduce manganese dioxide input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component, such as the manganese dioxide, conductive material, and barium sulfate are mixed together to form a homogeneous mixture. During the mixing process, an alkaline electrolyte solution, such as from about 37% to about 40% KOH solution, is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix may be optimized to allow quality positive electrodes to be molded. Mix moisture optimization allows positive electrodes to be molded with minimal splash and flash due to wet mixes, as well as spalling and excessive tool wear due to dry mixes, with optimization helping to achieve a desired high cathode weight. Moisture content in the positive electrode mixture can affect the overall cell electrolyte balance and has an impact on high rate testing.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

The foregoing configurations address common discharge deficiencies associated with existing alkaline-cell batteries operating at high discharge rates. Through experimentation, it has been found that traditional alkaline cells do not entirely discharge when the cells are subject to high discharge rate usage. Specifically, it has been found that oxidation of zinc within the anode that causes the formation of ZnO is concentrated near the separator during high-rate discharge of alkaline cells containing generally homogeneous anodes. As mentioned above, because the ZnO has a higher particle volume than unreacted zinc, the ZnO formation near the separator effectively creates a barrier that impedes discharge of zinc particles positioned closer to the center of the anode.

Accordingly, by providing a plurality of first electrode portions (e.g., a plurality of anode portions) each having differing electrode characteristics, the characteristics of the first electrode may be modified to encourage a lower discharge resistance within first electrode portions closer to the central current collector (and away from the separator), which may increase the quantity of zinc available near the separator after certain depth of the discharge during moderate- and high-rate discharge of the cell. For example, different surfactant types may be provided in portions of the anode proximate the separator and proximate the current collector to spread out the current distribution so that a higher percentage of the anode active materials within the anode participate in the discharge reactions; a larger average particle size of anode active material may be disposed proximate the separator (e.g., to avoid the complete consumption of the zinc near the separator during moderate and high rate discharge); and/or the like. Moreover, the portions of the anode closer to the current collector may be modified to have decreased gassing characteristics, thereby reducing undesirable gassing when the anode is highly discharged.

CONCLUSION

Many modifications and other embodiments of the inventions set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A nozzle for providing an electrode material into an electrochemical cell, the nozzle comprising:
    a hollow tubular body extending between an open upper end and an open lower end;
    a lower deflector spaced apart from the open lower end of the hollow tubular body and forming an annular opening between a deflection surface of the lower deflector and the open lower end of the hollow tubular body; and
    a support rod connecting the lower deflector with the hollow tubular body, wherein the support rod is suspended within an interior of the hollow tubular body by one or more support trusses.

2. The nozzle of claim 1, wherein the support rod and the lower deflector define a conduit extending therethrough.

3. The nozzle of claim 1, wherein the lower deflector has a diameter larger than an outer second diameter of the hollow tubular body.

4. The nozzle of claim 1, wherein the deflection surface is embodied as a concave surface.

5. The nozzle of claim 1, wherein the annular opening is adjustable.

6. The nozzle of claim 1, wherein the annular opening has a height between about 0.09" to about 0.125".

7. The nozzle of claim 1, wherein the deflector has a diameter between about 0.24" to about 0.275".

8. The nozzle of claim 1, wherein the one or more support trusses are spaced at radial locations distributed at least substantially equally around an interior of the hollow tubular body.

9. The nozzle of claim 8, wherein the one or more support trusses comprises a plurality of support trusses at each radial location.

10. A method for forming an electrode of an electrochemical cell, the method comprising:
    positioning a nozzle within a central opening of the electrochemical cell;
    retracting the nozzle from the central opening of the electrochemical cell while continuously extruding a first anode material through an annular opening located proximate a lower end of the nozzle to form a first anode portion having a central opening; and
    extruding a second anode material into the central opening of the first anode portion,
    wherein the nozzle comprises:
        a hollow tubular body extending between an open upper end and an open lower end;
        a lower deflector spaced apart from the open lower end of the hollow tubular body and forming an annular opening between a deflection surface of the lower deflector and the open lower end of the hollow tubular body; and
        a support rod connecting the lower deflector with the hollow tubular body, wherein the support rod is suspended within an interior of the hollow tubular body by one or more support trusses.

11. The method of claim 10, wherein extruding the second anode material into the central opening of the first anode portion comprises extruding the second anode material through a central conduit within the nozzle while the nozzle is retracted from the central opening of the electrochemical cell.

12. The method of claim 10,
    wherein extruding the first anode material through the annular opening comprises:
        extruding the first anode material along a length of the hollow tubular body from the open upper end to the open lower end and against the deflection surface of the lower deflector, wherein the deflection surface redirects the first anode material through the annular opening.

13. The method of claim 12, further comprising adjusting a height of the annular opening.

14. The method of claim 10, wherein extruding the second anode material into the central opening of the first anode portion comprises extruding the second anode material into the central opening of the first anode portion after retracting the nozzle out of the central opening of the first anode portion.

15. A nozzle for providing an electrode material into an electrochemical cell, the nozzle comprising:
    a hollow tubular body extending between an open upper end and an open lower end;
    a lower deflector spaced apart from the open lower end of the hollow tubular body and forming an annular opening between a deflection surface of the lower deflector and the open lower end of the hollow tubular body; and
    a support rod connecting the lower deflector with the hollow tubular body, wherein the support rod is suspended within an interior of the hollow tubular body by one or more support trusses,
    wherein the support rod and the lower deflector define an annular conduit extending therethrough and the support rod defines an interior conduit extending therethrough.

16. The nozzle of claim 15, wherein a lower opening of the interior conduit is a through hole through a central portion of the lower deflector.

17. The nozzle of claim 15, the lower deflector has a diameter larger than an outer second diameter of the hollow tubular body.

18. The nozzle of claim 15, wherein the deflection surface is embodied as a concave surface.

19. The nozzle of claim 15, wherein the annular opening is adjustable.

20. The nozzle of claim 15, further comprising a connector configured to adapt a respective size of at least one of (a) an upper opening of the annular conduit or (b) an upper opening of the interior conduit to a respective size of a respective supply conduit.

* * * * *